(12) United States Patent
Nakama

(10) Patent No.: US 8,185,677 B2
(45) Date of Patent: May 22, 2012

(54) DATA REPRODUCING APPARATUS, CONTENT MANAGEMENT METHOD, PROGRAM, AND STORAGE MEDIUM

(75) Inventor: Satoshi Nakama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/024,262

(22) Filed: Feb. 9, 2011

(65) Prior Publication Data

US 2011/0128391 A1 Jun. 2, 2011

Related U.S. Application Data

(63) Continuation of application No. 11/860,793, filed on Sep. 25, 2007, now Pat. No. 7,904,621.

(30) Foreign Application Priority Data

Oct. 20, 2006 (JP) .................................. 2006-286882

(51) Int. Cl.
*G06F 13/12* (2006.01)
*G06F 13/38* (2006.01)

(52) U.S. Cl. ........................................................ 710/74
(58) Field of Classification Search ..................... 710/74
See application file for complete search history.

(56) References Cited

U.S. PATENT DOCUMENTS

| | | | | |
|---|---|---|---|---|
| 5,913,208 | A * | 6/1999 | Brown et al. | 707/706 |
| 6,658,423 | B1 * | 12/2003 | Pugh et al. | 1/1 |
| 7,860,317 | B2 * | 12/2010 | Xie et al. | 382/195 |
| 2002/0049760 | A1 * | 4/2002 | Scott et al. | 707/10 |
| 2007/0043757 | A1 * | 2/2007 | Benton et al. | 707/102 |
| 2008/0046260 | A1 * | 2/2008 | Ghielmetti et al. | 705/1 |

* cited by examiner

*Primary Examiner* — Henry Tsai
*Assistant Examiner* — Eric Oberly
(74) *Attorney, Agent, or Firm* — Cowan, Liebowitz & Latman, P.C.

(57) ABSTRACT

A data reproducing apparatus comprises: a reproducing unit adapted to read out data from a plurality of recording media; a list generating unit adapted to generate a content list which describes storage location information in association with contents stored in the plurality of recording media; and a communication unit adapted to communicate with an external device and sending the content list to the external device, wherein the list generating unit checks if the contents stored in the plurality of recording media include identical contents, and if the identical contents are detected, the list generating unit generates the content list including information indicating that the storage location information of the identical contents are integrated.

2 Claims, 7 Drawing Sheets

FIG. 5

| Drive Name | Storage | Amount of Contents | Access Speed |
|---|---|---|---|
| C-Drive | CF card | 129 | 20Mbps |
| D-Drive | SD card | 54 | 18Mbps |
| E-Drive | External HDD | 400 | 10Mbps |

FIG. 6

| 601 | 602 | 606 | 607 | 603 | 604 | 605 |
|---|---|---|---|---|---|---|
| ID | Content Name | Creation Date | File Size | Content Path | Integrated Flag | Download Path |
| 00000001h | IMG_1112.jpg | 2005/3/21 | 458KB | E:\DCIM\IMAGE103 | 1 | C:\DCIM\IMAGE101 |
| | | | | C:\DCIM\IMAGE101 | | |
| | | | | D:\DCIM\IMAGE101 | | |
| 00000002h | IMG_2001.jpg | 2005/9/11 | 1028KB | E:\DCIM\IMAGE201 | | E:\DCIM\IMAGE201 |
| 00000003h | IMG_2002.jpg | 2005/9/11 | 1643KB | E:\DCIM\IMAGE201 | | E:\DCIM\IMAGE201 |
| 00000004h | IMG_1001.jpg | 2005/2/11 | 782KB | C:\DCIM\IMAGE101 | | C:\DCIM\IMAGE101 |
| 00000005h | IMG_1301.jpg | 2005/8/15 | 857KB | C:\DCIM\IMAGE105 | | C:\DCIM\IMAGE105 |
| 00000006h | IMG_1021.jpg | 2005/2/25 | 650KB | D:\DCIM\IMAGE101 | | D:\DCIM\IMAGE101 |
| 00000007h | IMG_1022.jpg | 2005/2/25 | 625KB | D:\DCIM\IMAGE101 | | D:\DCIM\IMAGE101 |
| ... | | | | | | |

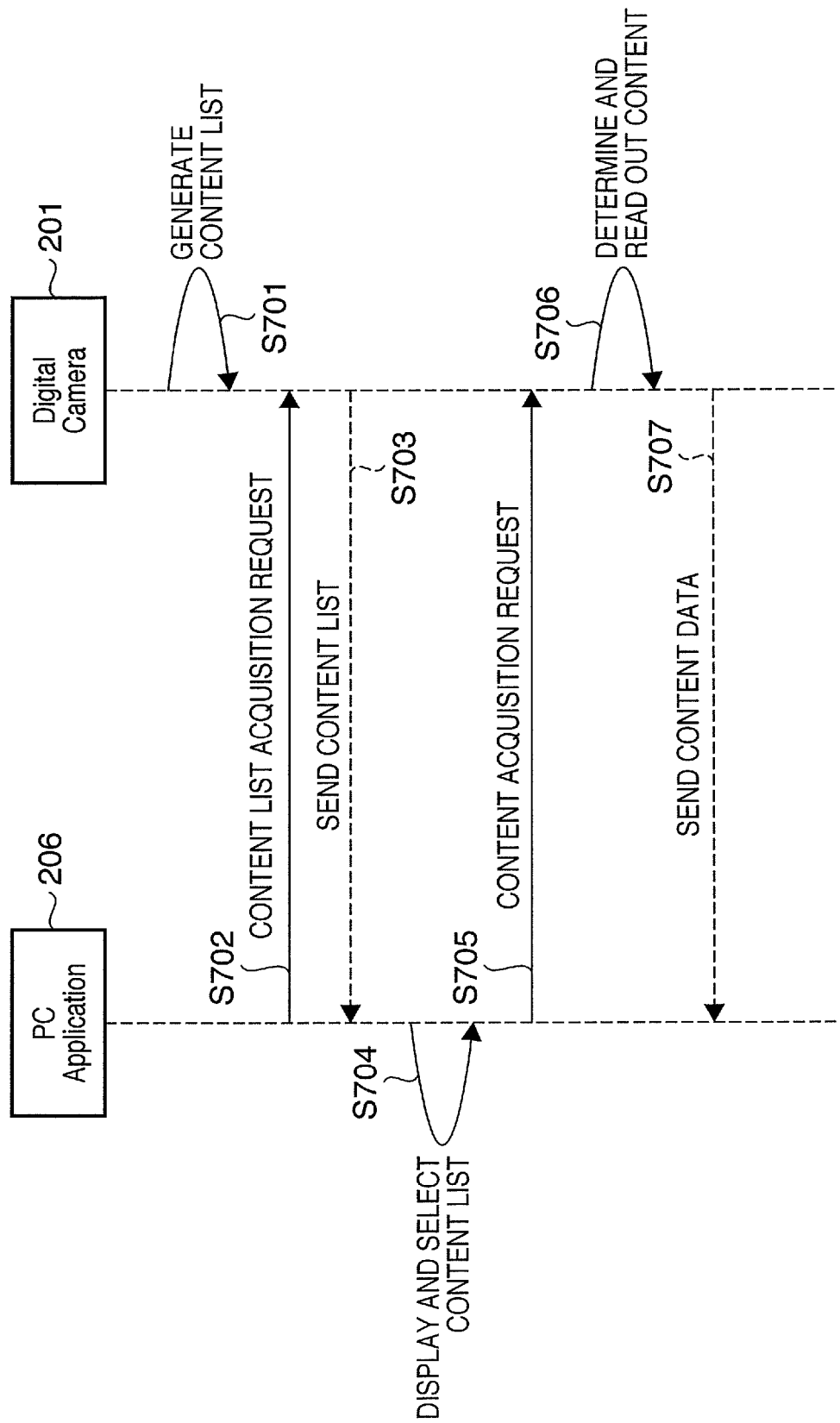

DATA REPRODUCING APPARATUS, CONTENT MANAGEMENT METHOD, PROGRAM, AND STORAGE MEDIUM

CROSS-REFERENCE TO RELATED APPLICATIONS

This application is continuation of application Ser. No. 11/860,793, filed Sep. 25, 2007, now U.S. Pat. No. 7,904,621 the entire disclosures of which is hereby incorporated by reference.

BACKGROUND OF THE INVENTION

1. Field of the Invention

The present invention relates to a data reproducing apparatus for reproducing a content stored in a recording medium by an image capturing apparatus such as a digital camera or the like, and a content management method.

2. Description of the Related Art

In image capturing apparatuses such as digital still cameras, digital video cameras, and the like, since a recordable data size dramatically increases with increasing number of pixels of image capturing elements, the capacities of recording media that is available for use in the image capturing apparatuses have increased accordingly. Also, a plurality of storages can be used to attain a large capacity, and a method that uses a large-capacity external storage device connected via a digital interface in addition to a recording medium that uses an internal slot of the image capturing apparatus is prevalent.

Recent image capturing apparatuses can use external storage devices such as a hard disk (HDD) and the like via a high-speed serial interface such as Universal Serial Bus (USB), IEEE1394, and the like simultaneously with internal recording media such as a memory card, disk, tape, and the like.

FIG. 1 shows an arrangement in which a digital camera 101 that uses a random access medium 102 as a recording medium and an external storage device 104 are connected via a USB interface cable 103. Both the digital camera 101 and external storage device 104 comprise USB interfaces, as a matter of course.

The digital camera 101 serves as a USB host, and the large-capacity external storage device 104 serves as a USB device (slave). When the USB host acquires data from the USB device via the USB interface, it is a common practice to make communications according to the standards such as PTP, Mass Storage, and the like. Note that PTP is a standard specified by "Universal Serial Bus Still Image Capture Device Definition Revision 1.0 Jul. 11, 2000". Also, Mass Storage is a standard specified by "Universal Serial Bus Mass Storage Class Bulk-Only Transport Revision 1.0 Sep. 31, 1999".

A case of communications compliant to Mass Storage will be explained below with reference to FIG. 1.

Upon detecting the connection of the external storage device 104 via the USB interface cable 103, the digital camera 101 acquires descriptor information from the external storage device 104. The digital camera 101 determines device information and a communication method, and recognizes the external storage device 104 as a device of Mass Storage Class. After that, the digital camera 101 acquires data according to Mass Storage. In this case, the digital camera 101 accesses all image data stored in the external storage device 104 via its internal file system.

The digital camera 101 also connects the random access medium 102 as a storage, and allows the user to display and browse image data via its internal file system. The user manipulates the digital camera 101 to designate a storage used to save and browse captured image data, and can also record the same image in a plurality of storages at the same time. The user individually designates the random access medium 102 and external storage device 104, thus freely manipulating saved image data.

With digital devices, it is a common practice to back up data and to control respective devices via a network. Consumer devices such as a digital still camera, digital video camera, and the like are also connected to the network and can communicate with external devices. Especially, by building up an IP network using an Internet Protocol (to be abbreviated as IP hereinafter), many devices are connected to each other and can exchange data. For example, in some system, the user can browse, via a personal computer (to be abbreviated to as PC hereinafter) or the like, moving image data stored in one external storage device such as a home server or the like connected to a tuner by converting the moving image data into a displayable format according to each external device (for example, Japanese Patent Laid-Open No. 2005-065008).

Like in the home server, the user can also browse image data stored in a digital still camera using an external device via the network. Digital devices undergo extensions such as support of interfaces that allow IP connections such as Ethernet®, Wireless LAN, and the like in addition to a serial bus network such as USB, IEEE1394, and the like. By providing, in a common format, an image designated by an acquisition request from an external device, images can be displayed on the external device.

However, upon issuing an acquisition request of a plurality of images stored in a plurality of recording media in addition to the designated image, if the plurality of recording media store identical images, the external device acquires all images including the identical images. Also, the external device displays the identical images simultaneously stored in the plurality of recording media. For this reason, when the user visually confirms images displayed on a display of the external device, he or she cannot discriminate their differences, resulting in confusion. Especially, when the external device adopts a display method that does not show image file names, attributes, and the like, a plurality of identical images are acquired, thus requiring a long time to acquire and display data.

SUMMARY OF THE INVENTION

The present invention has been made in consideration of the aforementioned problems, and has as its object to implement a technique that can efficiently provide contents to an external device by centralized management of identical contents stored in a plurality of storages.

According to the present invention, there is provided a data reproducing apparatus comprising: a reproducing unit adapted to read out data from a plurality of recording media; a list generating unit adapted to generate a content list which describes storage location information in association with contents stored in the plurality of recording media; and a communication unit adapted to communicate with an external device and sending the content list to the external device, wherein the list generating unit checks if the contents stored in the plurality of recording media include identical contents, and if the identical contents are detected, the list generating unit generates the content list including information indicating that the storage location information of the identical contents are integrated.

According to the present invention, there is provided a content management method in a data reproducing apparatus, which comprises a reproducing unit adapted to read out data from a plurality of recording media, a list generating unit adapted to generate a content list which describes storage location information in association with contents stored in the plurality of recording media, and a communication unit adapted to communicate with an external device and sending the content list to the external device, the method comprising: a step of checking if the contents stored in the plurality of recording media include identical contents; and a step of generating the content list including information indicating that the storage location information of the identical contents are integrated, when the identical contents are detected.

According to the present invention, contents can be efficiently provided to an external device by centralized management of identical contents stored in a plurality of storages.

Further features of the present invention will become apparent from the following description of exemplary embodiments with reference to the attached drawings.

BRIEF DESCRIPTION OF THE DRAWINGS

FIG. 5 shows an example of a management file list according to the embodiment of the present invention;

FIG. 6 shows an example of a content list according to the embodiment of the present invention; and FIG. 7 is a sequence chart executed when a PC acquires contents stored in the digital camera.

DESCRIPTION OF THE EMBODIMENTS

The best mode of carrying out the present invention will be described in detail hereinafter with reference to the accompanying drawings.

Note that the embodiments to be described hereinafter are examples to practice the present invention and should be appropriately modified or changed depending on the apparatus arrangement and various conditions to which the present invention is applied. Hence, the present invention is not limited to the following embodiments.

[System Arrangement]

Figure 1:
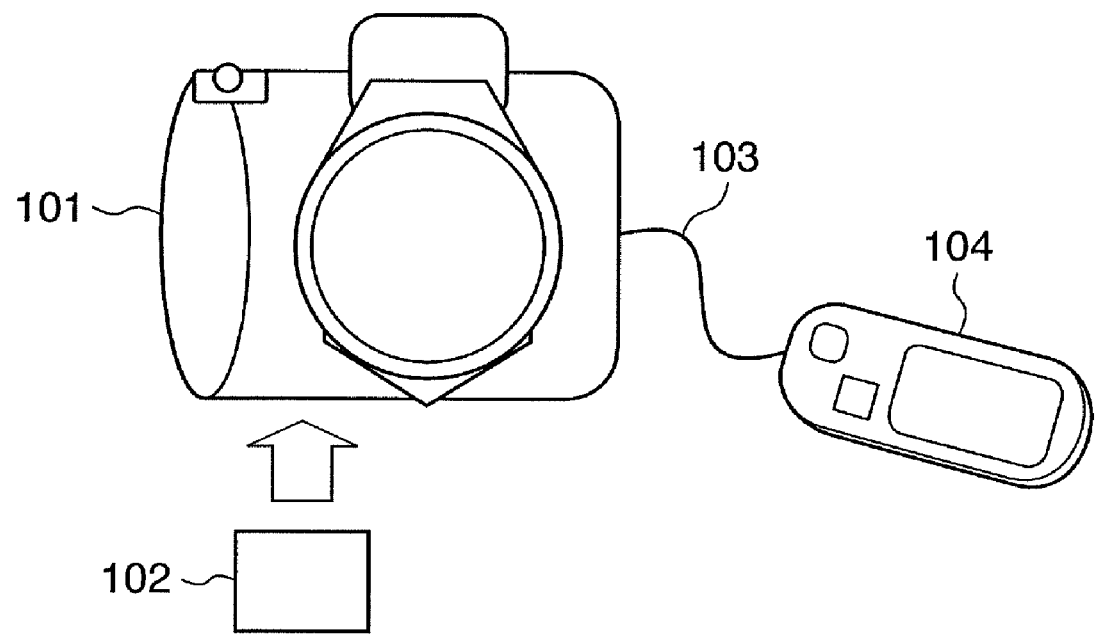
FIG. 1 is a view showing the arrangement in which a digital camera and external storage device are connected.
Figure 2:
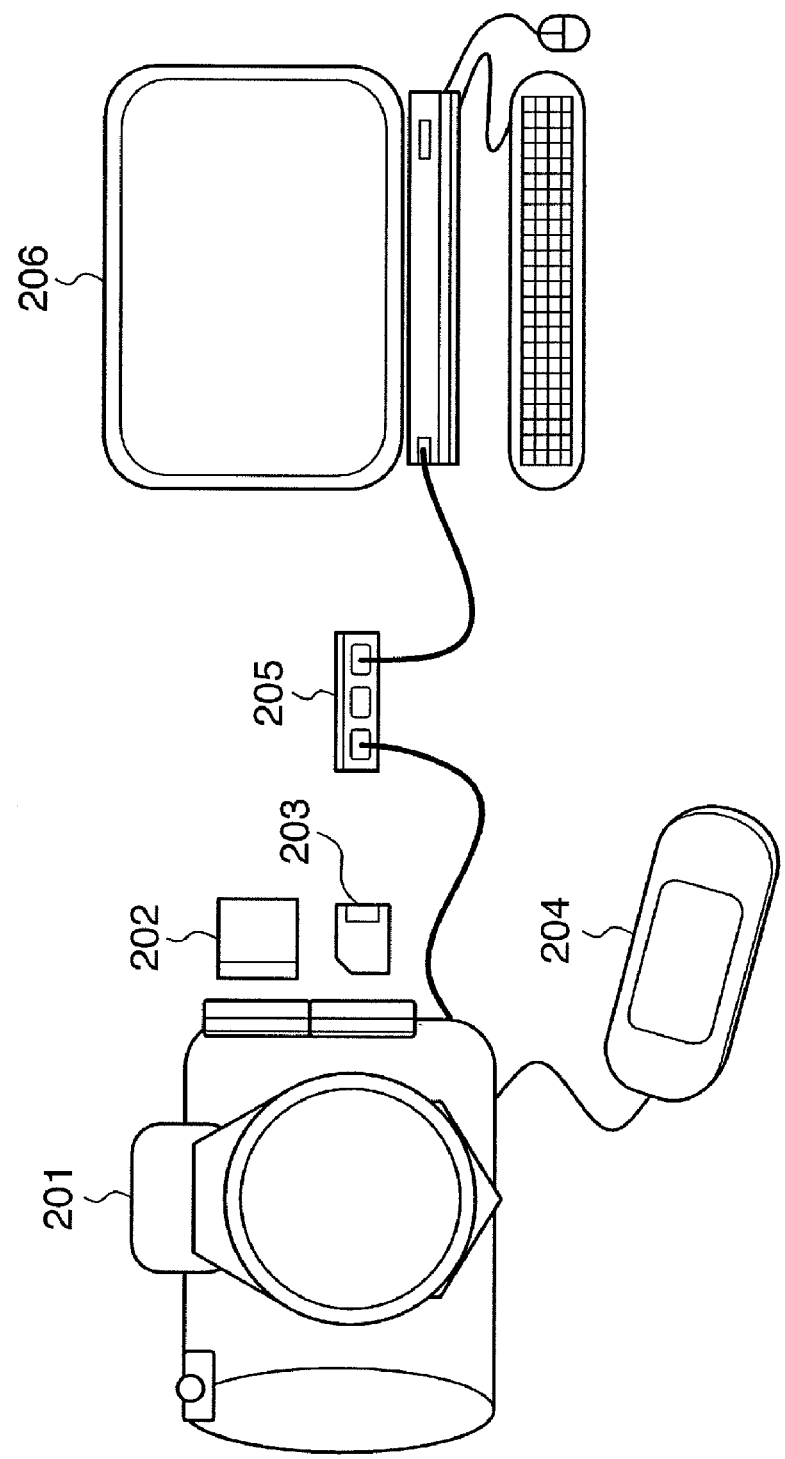
FIG. 2 is a view showing a content management system according to one embodiment of the present invention.

FIG. 2 shows a content management system according to one embodiment of the present invention.

Referring to FIG. 2, reference numeral 201 denotes a digital camera as an image capturing apparatus, which can detachably receive, as internal recording media, a CF (CompactFlash®) memory card 202 and SD™ (Secure Digital) memory card 203. Also, the digital camera 201 can connect a hard disk 204 as an external storage device via a USB interface cable.

The digital camera 201 is connected to a hub 205 via an Ethernet cable to form an IP network with a PC 206. The digital camera 201 implements data exchange, device control, and the like according to a command protocol on the IP network. As the command protocol on the IP network, a control command system defined by UPnP™ or DLNA (Digital Living Network Alliance) can be used.

This embodiment is premised on a server-client type command system in which the digital camera 201 (i.e., a data reproducing apparatus) returns responses to command requests from the PC 206. However, the present invention does not always require such specific command system. For example, the present invention can be practiced using other communication systems as long as protocols that can exchange data and commands are used.

Figure 3:
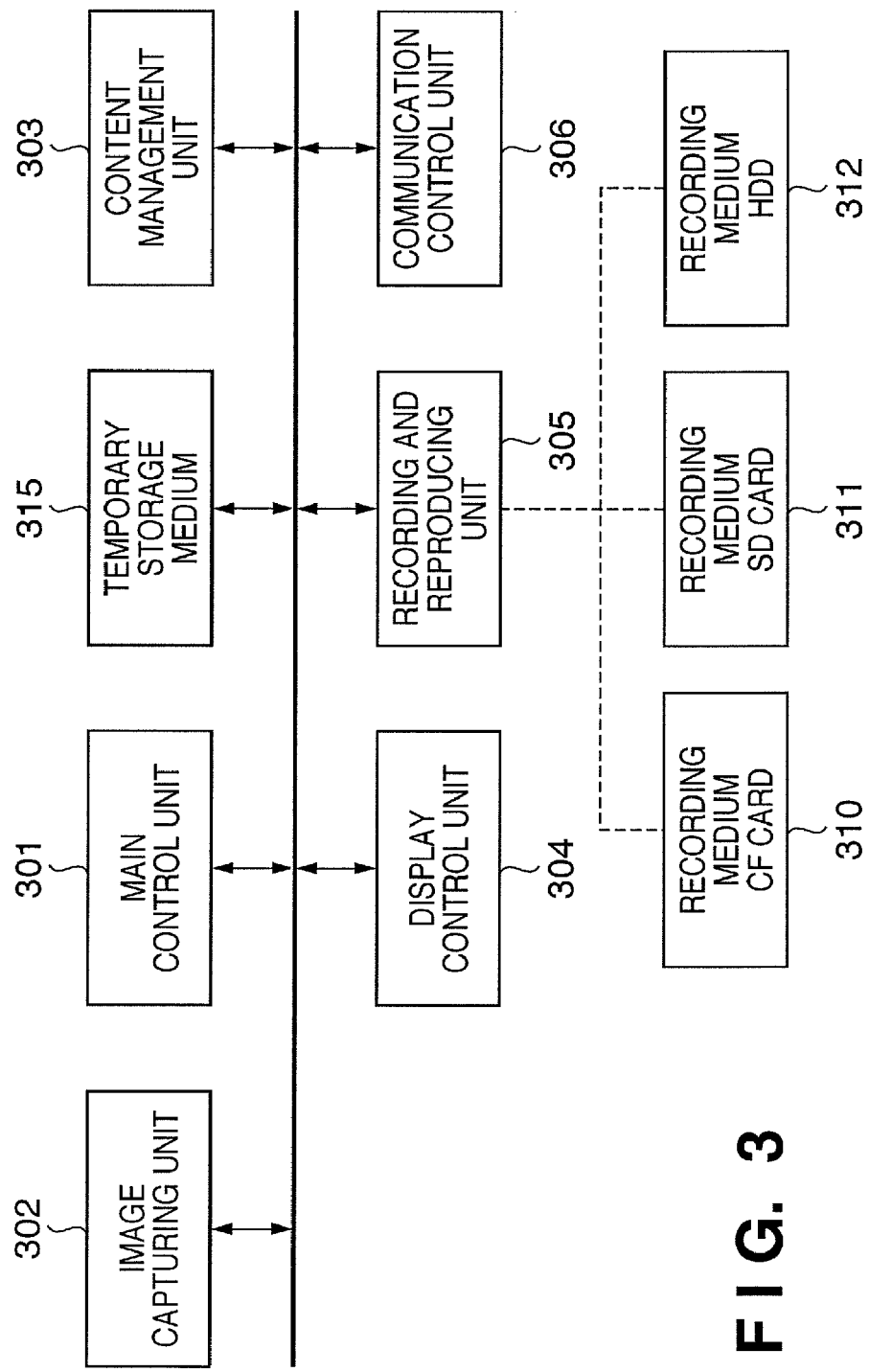
FIG. 3 is a block diagram showing the internal arrangement of a digital camera according to the embodiment of the present invention.

FIG. 3 is a block diagram showing the internal arrangement of the digital camera 201.

Referring to FIG. 3, a main control unit 301 systematically controls communication processing, image capturing processing, display processing, recording processing, and reproducing processing by the digital camera. An image capturing unit 302 mainly executes processes from when the user presses a trigger button until generation of an image to be handled as digital data, and issues recording and reproducing instructions to a recording medium connected or attached to a recording and reproducing unit 305.

The recording and reproducing unit 305 can receive, for example, a CF memory card 310 and SD memory card 311 as recording media. Furthermore, the recording and reproducing unit 305 can connect a hard disk (HDD) 312 via USB. Note that both the recording and reproducing unit 305 and hard disk 312 include USB interfaces. The aforementioned recording media, i.e., the CF card 310, SD card 311, and hard disk 312 serve as storages of image data and the like.

A display control unit 304 displays captured images, and also operation menus, alarm messages, and the like to the user.

A communication control unit 306 executes protocol control and data exchange upon making communications with external devices. The communication control unit 306 includes an Ethernet interface. A content managing unit 303 generates a content list based on contents of the respective recording media read out by the recording and reproducing unit 305, and temporarily records the content list on a temporary storage medium 315. The content managing unit 303 sends response data in response to a content list sending request or content reproducing request from an external application.

The digital camera 201 can simultaneously record contents such as captured images and the like on a plurality of recording media. In this case, the recording media are not related to each other, and only the digital camera 201 can recognize the contents on the recording media.

The content list generating processing by the digital camera 201 will be described below.

Figure 4:
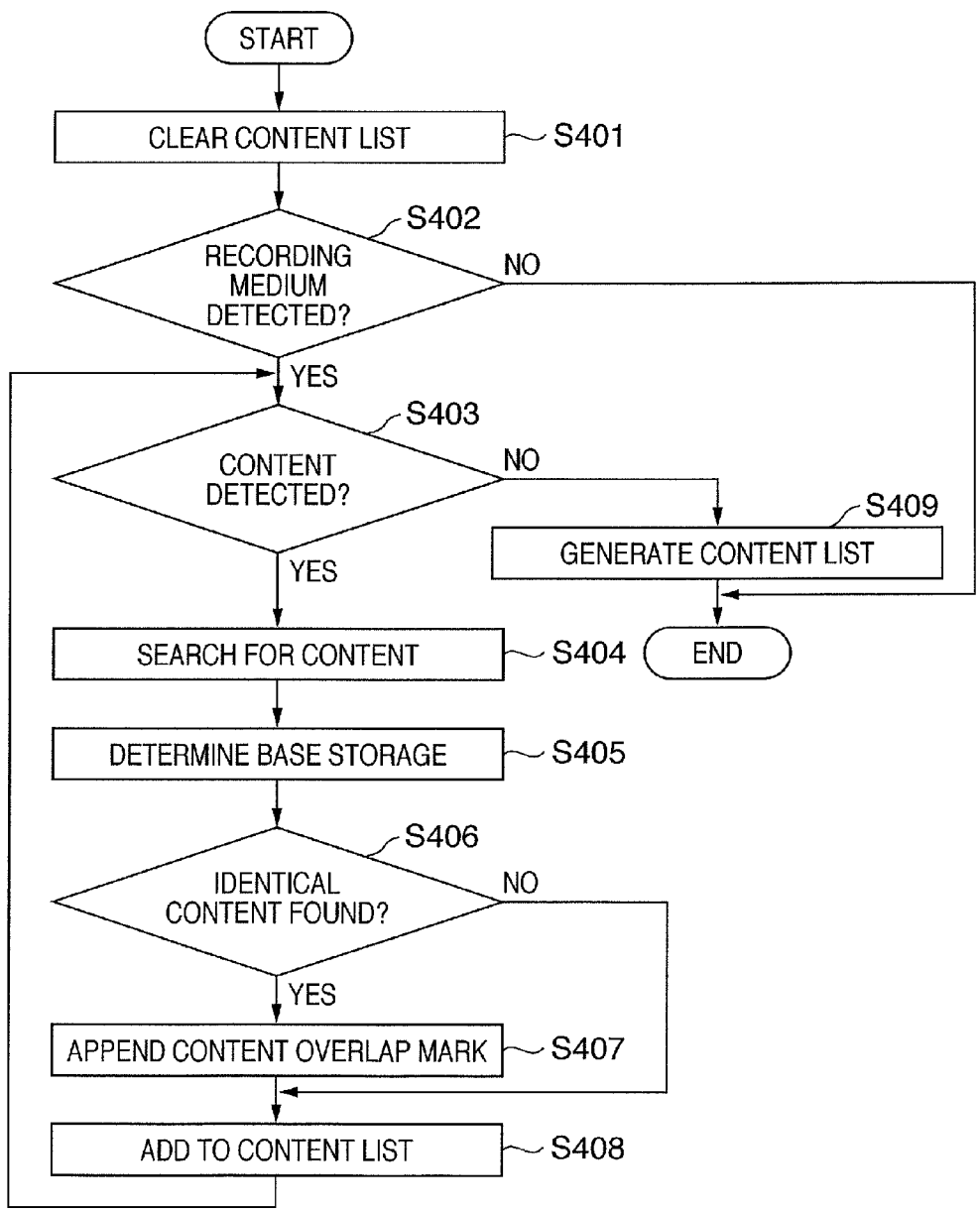
FIG. 4 is a flowchart showing the content list generation process by the digital camera.

FIG. 4 is a flowchart showing the content list generation process by the digital camera 201. In this embodiment, a content list is generated at the camera start-up timing. In addition to the camera start-up timing, a content list may be generated when the connection with the recording media or external device has changed, i.e., at the connection timing with an external device, at the connection timing with a recording media, at a specific content generation timing, or the like. In any of these cases, the object of the present invention can be achieved.

Referring to FIG. 4, after initialization of respective hardware modules according to an instruction from the main control unit 301 at the camera start-up timing, the content managing unit 303 clears a content list recorded in the temporary storage medium 315 (S401).

The recording and reproducing unit 305 checks if the recording media 310 to 312 are attached (connected) (S402). If at least one of these recording media is attached (YES in S402), the unit 305 detects if that recording medium includes a content that can be handled by the digital camera (S403). If the recording medium includes a content that can be handled (YES in S403), the content managing unit 303 starts content list generation process after a content search and the like. If there is no content that can be handled (NO in step S403), the unit 303 immediately generates a content list indicating that no content is found (S409).

If the recording medium includes a content that can be handled (YES in step S403), the content managing unit 303 acquires information such as the amount of contents, access speed, and the like for each recording medium from a management file list in the file system of the digital camera, prior to generation of a content list. FIG. 5 shows an example of the management file list. Furthermore, the unit 303 acquires identification information (file names, file sizes, file generation data and time, and the like) of contents recorded in each recording medium. The unit 303 conducts a content search based on various kinds of acquired information (S404).

The content managing unit 303 determines a recording medium including a largest amount of contents as a base storage in content list generation (S405). When a plurality of recording media include the same amount of contents, the unit 303 preferentially selects a recording media with a highest access speed as a base storage. Furthermore, when a plurality of recording media have the same amount of contents and the same access speed, the unit 303 selects a recording medium having a larger free capacity or total capacity as a base storage. In the management file list shown in FIG. 5, since "External HDD" has a largest amount of contents 501 compared to other media, the unit 303 generates a content list to have "External HDD" as a base storage. After the base storage is determined, the unit 303 searches for contents to be registered in a content list based on the base storage.

Next, the content managing unit 303 checks for each individual content if an identical content is stored in the plurality of recording media, based on the acquired content identification information, i.e., by comparing information such as file names, file sizes, and header files (S406). If the unit 303 determines in step S406 that the same content is stored in the plurality of different recording media (YES in S406), it appends, to the content list, a content overlap mark which indicates that an identical content is recorded in a plurality of recording media (S407).

When the identical content is recorded in a plurality of recording media, the content managing unit 303 registers a recording medium with a highest access speed in a recording medium column that represents the storage location of the corresponding content to be registered in the content list. For example, assume that files of an identical content are respectively recorded in all storages described in the management file list in FIG. 5 (contents overlap). In this case, since "CF card" has a highest access speed 502 compared to other media, the unit 303 registers "CF card" as the recording medium of the storage location of the overlapping content.

If an identical content is stored in no other recording media (NO in S406), the content managing unit 303 registers original information of that content in the content list. Upon completion of contents in the base storage, the unit 303 additionally registers contents in other storages in the list (S408).

In this way, by repeating the process of checking if each recording medium stores a content identical to that stored in another medium, the contents recorded in the respective recording media can be fully checked. Finally, if there is no more content to be added in step S403, the content managing unit 303 generates a content list in which all the contents have already been registered (S409).

The content list is generated for only recording media attached or connected at that time. Hence, if it is determined in step S402 that no recording medium is attached (connected) (NO in step S402), the content managing unit 303 skips generation of a content list. When the content list is updated at a timing other than the camera start-up timing, the unit 303 updates the list only for a recording medium or contents whose recorded data are updated, and does not execute any processing such as a search and the like for other content list.

FIG. 6 shows an example of the generated content list. The content managing unit 303 manages respective contents by storing data in columns of an ID (identification information) 601 and content name 602 in correspondence with each other. In response to an acquisition request or the like from an external application using an ID-based protocol such as PTP or the like, required information is received based on this ID.

Especially, when contents overlap in respective recording media, the content managing unit 303 appends an "Integrated Flag" 604 as the content overlap mark, and describes all pieces of storage location information of contents in a column of a content path 603. In a column of a download path 605 which represents the recording medium as the storage location upon reception of a sending request from an external application or the like and reading out content data, the unit 303 describes a path indicating a content in a storage with a highest transfer speed (e.g., CF card) as a base recording medium. Upon sending the content data to an external application, the unit 303 removes a conversion table of the content path 603 from the content list, thus allowing the external application to display the content list.

Also, the content list can be sorted based on a content generation date and time 606, file size 607, and the like.

FIG. 7 shows the sequence when the PC 206 acquires a content stored in the digital camera 201.

As shown in FIG. 7, the digital camera 201 generates the content list by the procedure described with reference to FIG. 4 at the start-up timing, and records the content list in the temporary storage medium 315 inside the camera (S701).

When the PC 206 establishes a connection to the digital camera 201 to be able to communicate with each other, an application on the PC 206 sends a content list acquisition request to the digital camera 201 (S702).

When the digital camera 201 receives the content list acquisition request from the PC 206 via the communication control unit 306, the main control unit 301 interprets the command, and sends the content list recorded in the temporary storage medium 315 to the PC 206 (S703). Upon reception of the content list on the PC 206, the application of the PC 206 generates and displays a user interface (UI) window using the content list (S704). The user selects a predetermined content from the UI window displayed on the PC 206 (S704), and sends a content acquisition request to the digital camera 201 (S705).

When the digital camera 201 receives the content acquisition request from the PC 206 via the communication control unit 306, the main control unit 301 interprets the command, and the content managing unit 303 determines the storage location of the content of interest using the conversion table of the content list. Furthermore, the recording and reproducing unit 305 reads out data from the recording medium as the determined storage location (S706). After that, the readout content data is sent to the PC 206 (S707).

Upon sending data to the PC 206, since the digital camera 201 reads out content data, which overlaps in a plurality of recording media, from the recording medium with the highest access speed, reception, display, and the like at the PC 206 can be quickly made.

In case of an application which designates the recording medium and displays content data on the PC 206 side, if the user can refer to the overlap mark 604 and content path 603 of the content list, he or she can avoid an identical content from being repetitively acquired. For this reason, the need for troublesome data exchange operations required to display a content can be eliminated, thus improving operability.

OTHER EMBODIMENTS

The preferred embodiments of the present invention have been explained using their practical examples, and the present invention can be practiced in the forms of a system, apparatus, method, program, storage medium (recording medium), and the like. More specifically, the present invention can be applied to either a system constituted by a plurality of devices, or an apparatus consisting of a single equipment.

The objects of the present invention can be achieved by implementing some of the illustrated functional blocks and operations by either hardware circuits or software processing using a computer.

Note that the present invention includes a case wherein the invention is achieved by directly or remotely supplying a program of software that implements the functions of the aforementioned embodiments to a system or apparatus, and reading out and executing the supplied program code by a computer of that system or apparatus. In this case, a computer of the system or the like reads out and executes the program code.

Therefore, the program code itself installed in a computer to implement the functional processing of the present invention using the computer implements the present invention. That is, the present invention includes the computer program itself for implementing the functional processing of the present invention.

In this case, the form of program is not particularly limited, and an object code, a program to be executed by an interpreter, script data to be supplied to an OS, and the like may be used as long as they have the program function.

As a recording medium (storage medium) for supplying the program, for example, a flexible disk, hard disk, optical disk, magneto-optical disk, and the like may be used. In addition, MO, CD-ROM, CD-R, CD-RW, magnetic tape, nonvolatile memory card, ROM, DVD (DVD-ROM, DVD-R), and the like may be used.

As another program supply method, connection can be established to a home page on the Internet using a browser on a client computer, and the computer program itself of the present invention can be downloaded from the home page. Also, the program can be supplied by a compressed file containing an automatic installation function from the home page onto a recording medium such as a hard disk or the like. Also, the program code that forms the program of the present invention may be segmented into a plurality of files, which may be downloaded from different home pages. That is, the present invention includes a WWW server which makes a plurality of users download a program file required to implement the functional process of the present invention by a computer.

Also, a storage medium such as a CD-ROM or the like, which stores the encrypted program of the present invention, may be delivered to the user, and the user who meets a predetermined condition may be allowed to download key information that decrypts the program from a home page via the Internet. In this case, the user executes the encrypted program using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function expansion board or a function expansion unit, which is inserted in or connected to the computer, after the program read out from the recording medium is written in a memory of the expansion board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-286882, filed Oct. 20, 2006, which is hereby incorporated by reference herein in its entirety.

What is claimed is:

1. An image capturing apparatus capable of storing captured image data in a plurality of recording media, comprising:

a communication unit configured to communicatively connect with an external device; an image capturing unit configured to capture an object and generate image data of the object;

a recording and reproducing unit configured to record the image data in the plurality of recording media, and read out the image data from the plurality of recording media;

a list generating unit configured to generate a content list which describes storage location information of each image data stored in the plurality of recording media;

a sending unit configured to send the content list to the external device which is connected to the image capturing apparatus via said communication unit; and a connection unit configured to detachably connect the plurality of recording media, wherein the plurality of recording media include at least one of internal recording media and at least one of external recording media, wherein said list generating unit checks if the image data stored in the plurality of recording media include identical image data, and if the identical image data are detected, said list generating unit arranges each of storage location information of the identical image data in the content list, and adds a mark indicating that the identical image data are stored in the plurality of recording media in the content list, wherein the mark is added by being corresponded to the storage location information of the identical image data arranged by said list generating unit, and wherein said list generating unit determines a recording medium with the largest number of stored image data from among the plurality of recording media as a base recording medium for describing and arranging each of storage location information of the identical image data in the content list.

2. An image capturing apparatus capable of storing captured image data in a plurality of recording media, comprising:

a communication unit configured to communicatively connect with an external device;

an image capturing unit configured to capture an object and generate image data of the object;

a recording and reproducing unit configured to record the image data in the plurality of recording media, and read out the image data from the plurality of recording media;

a list generating unit configured to generate a content list which describes storage location information of each image data stored in the plurality of recording media; and a sending unit configured to send the content list to the external device which is connected to the image capturing apparatus via said communication unit; and a connection unit configured to detachably connect the plurality of recording media, wherein the plurality of recording media include at least one of internal recording media and at least one of external recording media, wherein said list generating unit checks if the image data stored in the plurality of recording media include identical image data, and if the identical image data are detected, said list generating unit arranges each of storage location information of the identical image data in the content list, and adds a mark indicating that the identical image data are stored in the plurality of recording media in the content list, wherein the mark is added by being corresponded to the storage location information of the identical image data arranged by said list generating unit, and wherein said list generating unit determines a recording medium with the highest access speed from among the plurality of recording media as a base recording medium for describing and arranging each of storage location information of the identical image data in the content list.

* * * * *